UNITED STATES PATENT OFFICE.

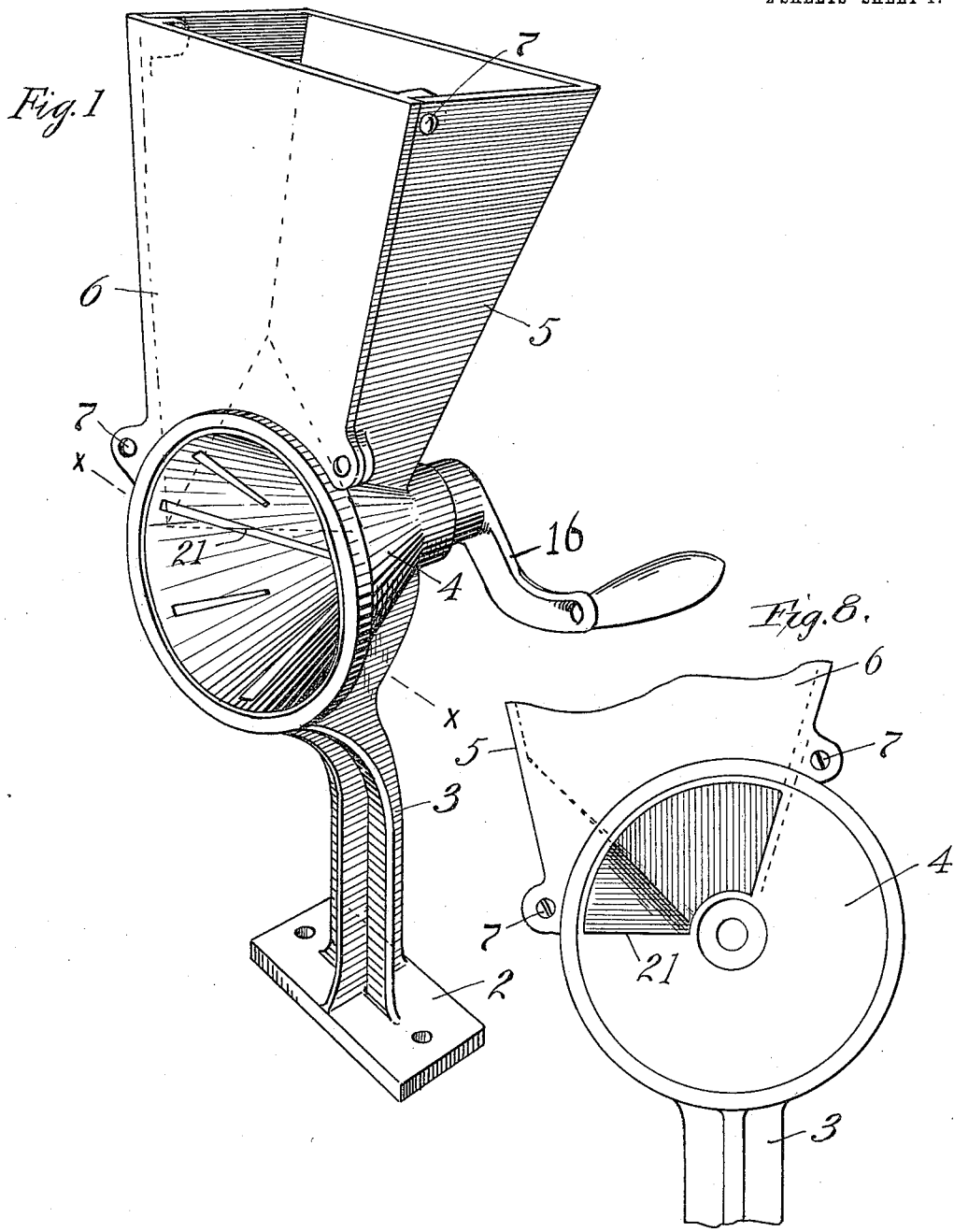

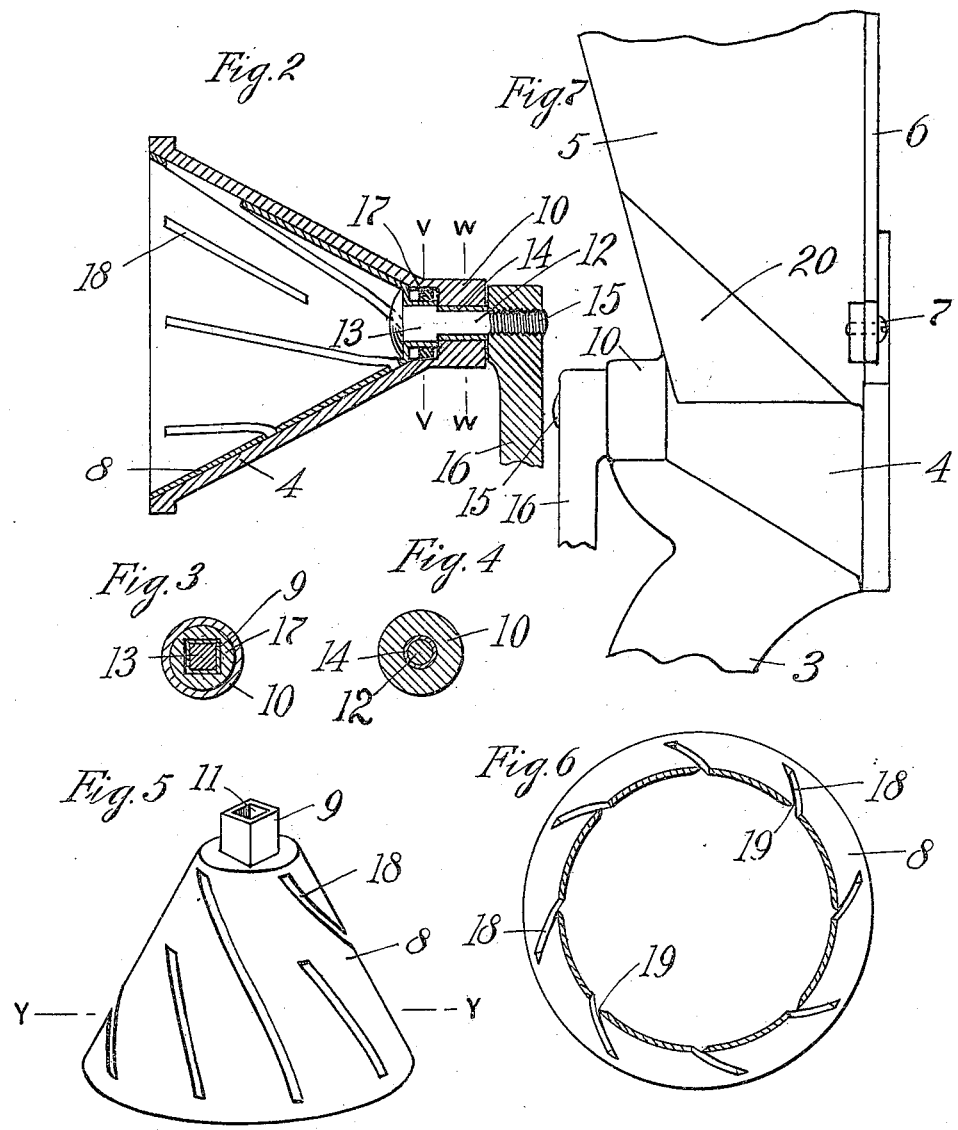

MICHAEL J. McFADDEN AND CHARLES C. HIERS, OF ST. PAUL, MINNESOTA.

NUT-SHAVING MACHINE.

962,239.  Specification of Letters Patent.  Patented June 21, 1910.

Application filed August 13, 1908. Serial No. 448,284.

*To all whom it may concern:*

Be it known that we, MICHAEL J. McFADDEN and CHARLES C. HIERS, citizens of the United States, residing at St. Paul, in the county of Ramsey and State of Minnesota, have invented certain new and useful Improvements in Nut-Shaving Machines, of which the following is a specification.

Our invention relates to improvements in nut shaving machines, its object being to provide a simple, convenient and efficient machine for shaving nuts and analogous articles into thin flakes or slices suitable for use in making ice cream and confectionery. To that end the invention consists in the construction, combination and arrangement of parts hereinafter described and claimed.

In the accompanying drawings forming part of this specification, Figure 1 is a perspective view of the machine, Fig. 2 is a horizontal section through the shell and cutting cone on line x—x of Fig. 1, Figs. 3 and 4 are sections on line v—v, and w—w, respectively, of Fig. 2, Fig. 5 is a perspective view of the cutting cone alone, Fig. 6 is a section through the cutting cone on line y—y of Fig. 5, Fig. 7 is a side elevation of a fragment of the machine showing the shape of the hopper on the feed side, and Fig. 8 is a front elevation of a fragment of the hopper with the cutting cone removed.

In the drawings is shown a hand operated machine having a frame comprising a base 2 adapted to be screwed or otherwise secured upon a work table, an upwardly extending post or leg 3, upon which are supported a central transversely disposed conical shell 4, and a hopper 5 extending upwardly from the conical shell and communicating therewith at the bottom. All of these parts may be made in one casting although in the drawings the front wall 6 is shown removably secured to the side walls of the hopper by means of bolts 7 so that it may be removed to clean the hopper.

Rotatably supported within the conical shell 4 is a hollow cutting cone 8 fitting the inner side of the shell and terminating at the apex in a squared lug 9, which fits rotatably within the sleeve 10 at the apex of the shell. The lug and the apex end of the cone are formed with a central square hole 11. The cutting cone 8 is drawn snugly into the outer shell by means of a headed bolt or pin 12 having a square shoulder 13 which fits within the hole 11 in the lug. The pin is journaled in a sleeve 14 in the sleeve 10 and has a screw threaded rearwardly projecting end 15 upon which is secured the operating handle 16. In order to center the cutting cone 8 more perfectly, a washer 17 is fitted over the lug 9.

The cutting cone is formed with a plurality of slits 18 arranged at a considerable angle with the plane of rotation, one side of each slit being slightly turned out and sharpened to form a cutting edge 19. It will be seen from Figs. 7 and 8 that the hopper extends on one side out beyond the cone and down almost or quite to the axis thereof, being longer upon that side than upon the other side, and the side wall is formed at the bottom with an inwardly extended or beveled portion 20, the lower edge 21 of which fits closely against the cutting cone.

In use the nuts or other articles are fed into the hopper and settle against the cutting cone on the side where the hopper is extended down, this being the side toward which the cone is rotated. When the cone is revolved the nuts will be caught between the cutting cone and edge 21 of the downwardly extended side of the hopper, so that the revolving cutting knives 19 will shave them effectively in the shell. As the shavings are cut they pass through the slits into the interior of the cutting cone, from which they will fall by gravity into any receptacle which may be placed beneath the mouth of the cone.

We claim as our invention:

1. In combination with a frame having a conical shell, a cutting cone rotatably mounted within said shell, a squared lug integral with said cone at the apex thereof, said squared lug being formed with a central square hole, a sleeve at the apex of the shell, a sleeve arranged within said first named sleeve, a headed bolt having a square shoulder, said head of the bolt engaging the cutting cone on the interior thereof adjacent the base of said squared lug thereof, said square shoulder of the bolt fitting within said square hole of the squared lug, said bolt having its opposite end passed through said second named sleeve and having an operating handle secured thereto, and a washer surrounding said squared lug and arranged between said sleeve of the shell and the end of the cutting cone at the base of the squared lug.

2. In combination with a frame having a conical shell, a cutting cone rotatably mounted within said shell, a squared lug integral with said cone at the apex thereof, said squared lug being formed with a central square hole, a sleeve on the shell at the apex thereof, a headed bolt having a square shoulder, said head of the bolt engaging the cutting cone on the interior thereof adjacent the base of said lug, said square shoulder of the bolt fitting within said square hole of the squared lug, said bolt having its opposite end passed through said sleeve of the shell and having an operating handle secured thereto.

In testimony whereof we affix our signatures in presence of two witnesses.

MICHAEL J. McFADDEN.
   CHARLES C. HIERS.

Witnesses:
 ARTHUR P. LOTHROP,
 HATTIE SMITH.